United States Patent [19]

Fisli

[11] 4,205,100
[45] May 27, 1980

[54] SYSTEM FOR PROVIDING ELECTROLESSLY NICKEL COATED POLISHED HIGH SPEED MULTI-FACETED POLYGONAL SCANNERS

[75] Inventor: Tibor Fisli, Los Altos Hills, Calif.

[73] Assignee: Xerox Corporation, Stamford, Conn.

[21] Appl. No.: 687,961

[22] Filed: May 19, 1976

[51] Int. Cl.² ............................ G02B 1/10; G02B 5/08
[52] U.S. Cl. ..................................... 427/162; 350/6.8; 350/299; 428/652
[58] Field of Search ................. 427/162, 438; 178/7.6; 428/80, 652; 350/7, 6.8, 299

[56] References Cited
U.S. PATENT DOCUMENTS

| | | | |
|---|---|---|---|
| 3,040,627 | 6/1962 | Bohn et al. | 350/7 |
| 3,607,457 | 9/1971 | Hagg et al. | 427/162 X |
| 3,726,771 | 4/1973 | Coll-Palagos | 427/438 X |

*Primary Examiner*—James R. Hoffman
*Attorney, Agent, or Firm*—Irving Keschner

[57] ABSTRACT

A system for providing multi-faceted high speed polygonal scanners is provided which comprises fabricating an aluminum polygonal scanner and thereafter electrolessly plating the scanner with nickel. A preferred specific aluminum alloy is also disclosed in addition to methods of employing these multi-faceted polygonal scanners in flying spot scanning applications.

5 Claims, 3 Drawing Figures

SYSTEM FOR PROVIDING ELECTROLESSLY NICKEL COATED POLISHED HIGH SPEED MULTI-FACETED POLYGONAL SCANNERS

BACKGROUND OF THE INVENTION

Multi-faceted scanners usually comprising multi-faceted rotating mirrors are employed in well known techniques for erecting optical scanning between a light source and a photocell. Typically, a light illuminates a silvered mirror for example, at an angle of 45° to direct light toward a facet that is reflected from the facet toward the object being scanned. Normally the object reflects this light back along the same path upon a photocell. The duration of the scan corresponds to the time for a facet to pass the light beam along the object being scanned. It is usually preferred that the object path scanned is independent of which facet is then in the light beam path.

In connection with television equipment, it is known to use mirror prisms for image scanning along one dimension, usually for line scanning. Since the advent of television, cameras operating in accordance with the image storage system, the need for such mirror prisms has become greatly increased. Recently television cameras have been designed for operation within the infra-red radiation range, for example, within the range of 2 to 5.5 microns. Television cameras operating within this wave-length require mirrors or similar light deflecting optical means for scanning an image. Usually one means, for instance, a light deflecting mirror, is used for vertical scanning image division. Rotary mirror prisms which are generally prisms composed of several plane mirrors such as glass mirrors are conventionally employed by suitably mounting them on a shaft or other rotary support. These mechanically composed rotary prisms are found to have many disadvantages, both as to their optical characteristics and their mechanical reliability. In particular, they have been found mechanically difficult to mount the several planed mirrors so that they accurately form a polygonal shape of predetermined dimensions. For short optical path lengths, slight misalignment of the facets is found to be of little practical significance. However, when the distance between the scanning mirror and the object being scanned is many feet, slight misalignment of the facets results in the path of scan changing from one facet to the other. Such a result is especially disadvantageous when scanning labels with an encoded stripe arrangement. If there is misalignment of the facets one facet might make a perfect scan of the coded strips while the next facet would register no scan at all or only scan a few of the stripes.

Morever, it is difficult to mount the mirrors so that they accurately retain their spatial positions when subjected to the stresses of high speed rotation. The last mentioned mounting problem entails a danger of injury to persons close to the spinning mirror prism which is often unavoidable. Obviously when the mirror prism should disintegrate shrapnel is produced which may cause serious injury to a bystander.

Thus, many methods have been investigated to produce multi-faceted scanners so that the materials from which they are composed would have high modulus to density ratio, low thermal expansion, low Poisson's ratio, good workability and possess the ability to be readily polishable or coatable with a substance which in turn can be polished to produce high quality optical surfaces. Unfortunately, the imposition of these material restrictions result in the requirement of a material which is not readily available. Presently, in view of these material restrictions and limitations, scanners are now being manufactured from glass, stainless steel, beryllium and chromium carbide. The latter two materials are the most widely used since they more nearly meet the requirements of the predicated material limitations. Of these two, beryllium is found to best satisfy the material requirements of the predicated material limitations and consequently is found to perform in a superior fashion when employed. However, the use of beryllium to provide multi-faceted scanners in and of itself results in still other problems among which are exorbitant cost of the material and the extreme difficulty of working the material into the desired configurations. Chromium carbide scanners, although not as expensive as beryllium scanners, possess very high density and therefore require in the overall general construction of the scanner a driver motor and bearings which are much heavier and much more costly to provide.

There is therefore a demonstrated need to provide multi-faceted scanner systems which may be precisely machined, inexpensively, and with great facility than known scanner systems enabling these multi-faceted scanners to be considered for employment in a vast number of applications other than military or development laboratories where the exorbitant costs of currently available scanner systems can only be justified.

It is therefore an object of this invention to provide a novel multi-faceted scanning system devoid of the above noted deficiencies.

It is another object of this invention to provide a novel multi-faceted scanner capable of operation at high rotational speeds.

It is another object of this invention to provide a novel multi-faceted scanner system characterized by precise alignment of the facets.

Another object of this invention is to provide a novel scanning system which achieves precise alignment of the different facets with techniques that are relatively easy to perform.

These and other objects of the instant invention are accomplished, generally speaking, by providing a multi-faceted high speed scanner which is fabricated from an aluminum polygon and thereafter electroless plated with nickel. The plated scanner thus provided is polished to a mirror-like finish. Prior art devices such as outlined in Bohn et al, U.S. Pat. No. 3,040,627, have disclosed a rotatable mirror for use in high speed photography having an assembly of circumferentially spaced mirrors. The mirror carrier in Bohn et al is disclosed to be aluminum. However, electroless plating of the aluminum polygon is not disclosed. Moreover it has been found that a specific aluminum alloy i.e., aluminum alloy designated as 7075-T651, having the properties hereinafter recited with nickel is seen to be a substantial step forward in the prior art with regard to the production of high speed multi-facet polygonal scanners and therefore represents a preferred embodiment of the system of the instant invention. The plated scanner thus provided may be easily polished unlike commercially available aluminum to a mirror finish which is extremely suitable for high speed scanning. 7075-T651 aluminum alloy is found in the literature to have the following properties:

7075-T651 ALUMINUM ROD

This alloy is recommended when extra strength and hardness are required. It is used primarily for aircraft and ordinance applications.

| Nominal Chemical Composition | |
|---|---|
| Zinc | 5.6% |
| Magnesium | 2.5% |
| Copper | 1.6% |
| Chromium | 0.3% |
| Aluminum | Balance (incl. normal impurities) |

| | | |
|---|---|---|
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F. | 890–1180 |
| | Electrical Conductivity, % IACS at 20° C. (68° F.) | 33 |
| | Thermal Conductivity, btu at 25° C. (77° F.) | 900 |
| | Average Coefficient of Thermal Expansion at 68° to 212° F. | 0.0000131 |

These typical properties are average values.

| Fabricating Performance | |
|---|---|
| Cold Forming: | Poor |
| Machining: | Good |
| Brazing: | Not Suitable |
| Welding: | |
| Arc, | Poor |
| Gas, | Poor |
| Resistance, | Good |

| | Government & Industry Specifications | |
|---|---|---|
| | Cold Finish-Rolled | Extruded |
| A.M.S. | 4122C, 4123A | 4154F, 4168A, 4169B |
| A.S.T.M. | B211 | B221 |
| Federal | QQ-A-225-9b(QQ-A-282) | QQ-A-200/11b(QQ-A-277) |
| Military | None | None |
| S.A.E. | AA7075 | AA7075 |

Although the fabrication of the specific aluminum alloy preform is performed to precise specifications in a specific manner, any suitable technique which is conventional and well-known to those skilled in the art may be employed.

In order to satisfy design specifications, generally certain conventional machining techniques are employed which utilize precisely honed cutting tools to produce for example a specific 6 microinch finish. Optical and dynamic considerations may for example restrict the radial run-out to 0.0003 inches. More than 0.0003" radial difference among facet may tend to create an unbalanced condition during rotation, which would produce vibration, which in turn would tend to blur details in the image plate. The surface of this machined scanner must be free of cuts, voids, burrs, grease and acid since all of these adversely affect the subsequent plating. Milling of the facets must be done in groups to assure uniform across-facet diameters and this will be important during polishings. The lathe work performed must be done on centers while the scanner is located on its final mounting surface.

Although it is sufficient to plate the aluminum scanners with a thickness of electroless nickel e.g. of at least about 0.0020 inches, any suitable thickness may be employed in accordance with the application of appropriate conventional machining and polishing techniques which govern the resulting uniform thicknesses obtainable. The nickel employed should e.g. contain approximately 6% phosphorous in order to enhance its hardness for easier polishings although any suitable amount of phosphorous may be employed. The plating is done employing conventional techniques which provide a plating free of voids, cracks, and nodules and good adhesion to the aluminum substrate.

The facets are then polished employing conventional techniques to a flat mirror-like finish and then may be coated with aluminum and silicon monoxide for maximum reflectivity and durability. The scanners are then checked for angular accuracy, radius, facet flatness and surface quality employing conventionally known techniques.

The general premise of the system of the instant invention having been described, the specifics of the system of the instant invention will be more clearly understood with reference to the drawings which follow of which:

Figure 1:
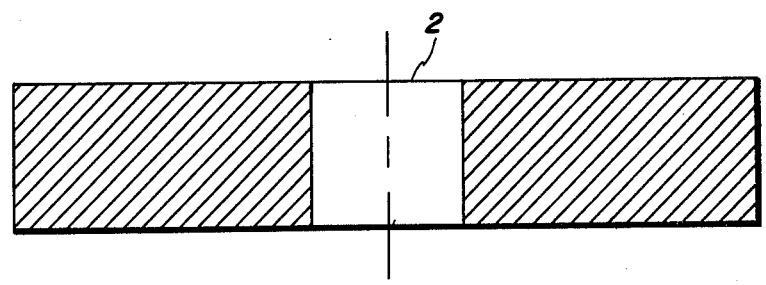
FIG. 1 represents a precisely machined aluminum alloy polygon.

In FIG. 1 is seen a precisely machined aluminum alloy multi-faceted scanner generally designated as 1 of the specific aluminum alloy recited above. The bore 2 receives a supporting hub (not shown) around which the scanner rotates. This aluminum polygon is precisely machined in accordance with techniques hereinafter described.

The procedure hereinafter outlined as illustrative of the specific conventional machining procedures which may be employed. The blanks are cut off from a round aluminum bar and placed in a lathe chuck. One side of the blank is turned to a 16 microinch finish or better using diamond or carbide cutting tools. The blank is removed from the chuck and placed in a soft collet-type chuck whose surface is cut in the lathe just prior to this operation to assure the required parallelism of the two sides of the facet. After the second side is also turned to the proper finish and geometry, the mounting hole is bored. The machined disk is placed on a precise rotary table. A precisely machined rod is fixed to the table such that its axis coincides with the rotational axis of the table. The disk is placed on this rod and secured for example with a nut and the rotary table is placed on a milling machine. In order to avoid thermal expansion of the mill during the machining the mill should be turned on for at least 4 hours prior to facet milling. The machine is set to the proper radius of scanner facet and with a diamond or tungsten carbide cutting tool, (flying cutter preferred) the facets are milled to 8 microinch finish or better, and to a radial tolerance not exceeding 0.0005 inch. After proper clearing the scanner is ready for the electroless nickel coating.

Figure 2:
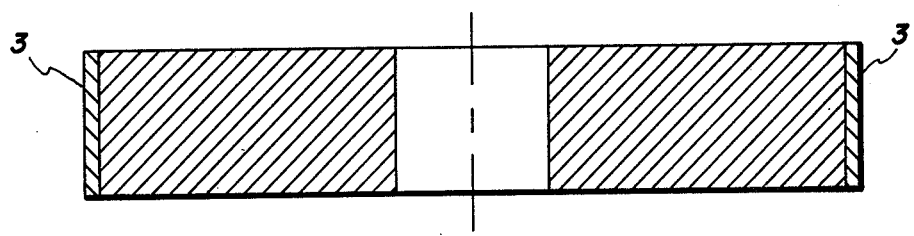
FIG. 2 represents the aluminum alloy polygon of FIG. 1 electrolessly coated with a thin coating of nickel.

In FIG. 2 is seen the aluminum polygon of FIG. 1 which has been electrolessly coated with nickel. The electroless coating is performed employing conventional techniques.

Generally, the coating is applied to a thickness e.g. of 0.0025 inch to 0.0050 inch. A preferred thickness of nickel coating includes 0.0035 inch to 0.0045 inch while 0.004 inch is found to be optimal.

Figure 3:
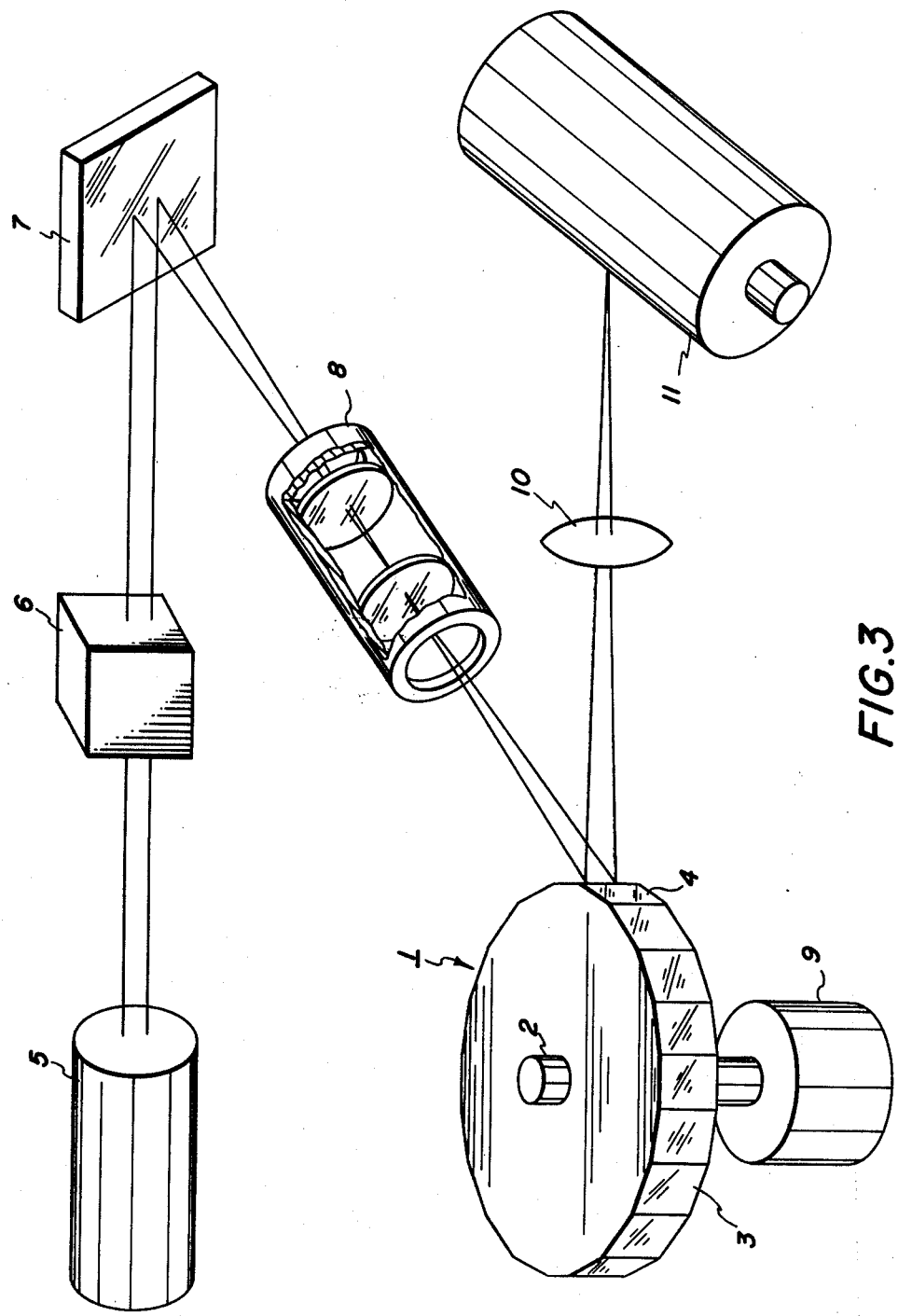
FIG. 3 illustrates a conventional application of the electroless coated scanner.

In FIG. 3 is seen a conventional application of the high speed multi-faceted scanner thus provided in FIG. 2 which has been polished and in turn coated with aluminum and silicon monoxide for maximum reflectivity and durability. A laser 5 emits light through a modulator 6 which is reflected by a mirror 7 to a beam expander 8. The expanded beam impringes on the scanner facets 4 which are rotated at high speed by motor 9. The scanned beam then passes through a focusing lens 10 and is directed to the photoreceptor surface 11. The facets 4 are polished in accordance with those techniques recited above and the aluminum coating and a protective coating e.g. silicon monoxide or MgF$_2$ may be applied according to the following conventional techniques: several scanners are assembled on a rod and placed in a vacuum chamber along with (aluminum and either) MgF$_2$ or SiO. The chamber is pumped down to the required vacuum and the (A1 and either) MgF$_2$ or SiO are evaporated (in that order) by heating them above their respective melting points.

Typical applications of this system include deflection of a light beam such as laser in such a manner that it produces a "flying spot". When this bright spot is moved across an object-document having high and low density areas by rotation of the scanner, a light detector (placed in the vicinity) provides an electronic signal which is low or non-existent when the spot is in a dark area, and high when the spot is in a light area of the document. This type of scanning system is used in facsimile devices and in optical character readers. Since this system can be used (in conjunction with other hard and software) to decode alpha numerics, it is also known as a "reader". Another system which also uses multi-faceted scanners is the so-called "write" system. The overall arrangement in general is the same except that in the stationary path of the beam (before the scanner) a light switch known as a modulator is used to "write" the image on a xerographic photoreceptor. The signal going into the modulator can come either from the light detector of the "read" station, or from a character generator which is the case with computer printers.

To further define the specifics of the present invention, the following examples are intended to illustrate and not limit the particulars of the present system. Parts and percentages are by weight unless otherwise indicated.

EXAMPLE I

An aluminum alloy 7075-T651 as before described is precisely machined into a polygonal configuration having the following dimensions: 24 facet, 2860" diameter across facets, 0.375" thick. The precisely machined aluminum polygon thus provided is then coated with nickel employing an electroless nickel coating technique conventional to the art at a thickness of 0.004 inches. The nickel coating faces are then polished employing the techniques recited above to a mirror-like finish. A coating of aluminum is then deposited over the polished nickel faces to a thickness of approximately 1000A° employing the technique outlined by P. Bannister in *Applied Optics and Optical Engineering,* ACADEMIC PRESS, 1965, page 301 et sequel. A 100A° coating of silicon monoxide is then applied according to the foregoing technique for protecting the face of the polygonal scanner and to provide maximum reflectivity and durability. The multi-faceted scanner thus provided is placed in a high speed scanning system as in FIG. 3.

Although the present example was specific in terms of conditions and materials used, any of the above listed typical materials may be substituted when suitable in the above example with similar results. In addition to the steps used to carry out the process of the present invention, other steps or modifications may be used if desirable. In addition, other materials may be incorporated in the system of the present invention which will enhance, synergize, or otherwise desirably affect the properties of the systems for their present use.

Anyone skilled in the art will have other modifications occur to him based on the teachings of the present invention. These modifications are intended to be encompassed within the scope of this invention.

what is claimed is:

1. A process for providing high speed multi-faceted polygonal scanners comprising providing a precisely machined aluminum polygon having a multiplicity of smoothly machined facet faces, electrolessly plating said aluminum polygon with nickel and polishing the nickel coated faces to a mirrorlike finish.

2. The process as defined in claim 1 wherein said aluminum alloy is designated as 7075-T651 having the following properties:

| Nominal Chemical Composition | | |
| --- | --- | --- |
| | Zinc | 5.6% |
| | Magnesium | 2.5% |
| | Copper | 1.6% |
| | Chromium | 0.3% |
| | Aluminum | Balance (incl. normal impurities) |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |
| Typical Physical Properties | Density, Lbs./Cu. In. | 0.101 |
| | Melting Range, approx. °F. | 890–1180 |
| | Electrical Conductivity, % IACS at 20° C. (68° F.) | 33 |
| | Thermal Conductivity, btu at 25° C. (77° F.) | 900 |
| | Average Coefficient of Thermal Expansion at 68° to 212° F. | 0.0000131 |

3. The process as defined in claim 1 wherein said aluminum polygon is electrolessly nickel coated to at least about 0.0020 inches.

4. The process as defined in claim 1 wherein said electrolessly nickel coated polygon is further coated with aluminum and then silicon monoxide to provide maximum reflectivity and durability.

5. A high speed multi-faceted polygonal scanner comprising a precisely machined aluminum alloy polygon having a multiplicity of smoothly machined facet faces and an electrolessly plated nickel coating over said aluminum polygon, said nickel coating having been polished to a mirror-like finish and said aluminum polygon comprising an aluminum alloy designated as 7075-T651 having the following properties:

| Nominal Chemical Composition | |
| --- | --- |
| Zinc | 5.6% |
| Magnesium | 2.5% |
| Copper | 1.6% |

-continued

| | Chromium | 0.3% |
| --- | --- | --- |
| | Aluminum | Balance (incl. normal impurities) |
| Typical Mechanical Properties | Tensile Strength, psi | 83,000 |
| | Yield Strength, psi | 73,000 |
| | Elongation, % in 2" | 11 |
| | Shear Strength, psi | 48,000 |
| | Brinell Hardness 10/500 | 150 |

-continued

| | | |
| --- | --- | --- |
| Typical Physical Properties | Density, Lbs./Cu. In. | 0.101 |
| | Melting Range, approx. °F. | 890–1180 |
| | Electrical Conductivity, % IACS at 20° C. (68° F.) | 33 |
| | Thermal Conductivity, btu at 25° C. (77° F.) | 900 |
| | Average Coefficient of Thermal Expansion at 68° to 212° F. | 0.0000131 |

* * * * *